United States Patent [19]
Voit et al.

[11] Patent Number: 5,754,546
[45] Date of Patent: May 19, 1998

[54] AIN NARROWBAND TO VIDEO SIGNALLING

[75] Inventors: Eric A. Voit, Baltimore; Larry W. Sours, Crofton; Lance S. Liptak, Laytonsville, all of Md.; Kenneth E. DePaul, Wake Forest, N.C.

[73] Assignee: Bell Atlantic Network Services, Inc., Arlington, Va.

[21] Appl. No.: 563,400

[22] Filed: Nov. 30, 1995

[51] Int. Cl.$^6$ .......................... H04M 7/06; H04N 7/173
[52] U.S. Cl. ................ 370/384; 370/522; 379/229; 348/16
[58] Field of Search .................. 370/352, 360, 370/384, 385, 522; 379/207, 220, 229, 230; 348/6, 7, 14, 16

[56] References Cited

U.S. PATENT DOCUMENTS

| | | | |
|---|---|---|---|
| 5,570,420 | 10/1996 | Bress et al. | 379/220 |
| 5,574,779 | 11/1996 | Ely et al. | 379/207 |
| 5,583,927 | 12/1996 | Ely et al. | 379/207 |
| 5,608,447 | 3/1997 | Farry et al. | 348/7 |

OTHER PUBLICATIONS

Berman et al, "Perspective on the AIN Architecture", IEEE Communications Magazine, Feb. 1992, pp. 27–32.

"The Space system: A new dimension in service creation", Bellcore Exchange, Jan./Feb. 1992, pp. 8–13.

"Turning concepts into reality with the Space system", Bellcore Exchange, May/Jun. 1992, pp. 25–28.

"Introduction to Bellcore's Integrated Service Control Point Software", Bellcore, 1992, pp. 1–8.

*Primary Examiner*—Hassan Kizou
*Attorney, Agent, or Firm*—Lowe, Price, LeBlanc & Becker

[57] ABSTRACT

An advanced intelligent network (AIN) comprises a services control point providing fully integrated service logic for both narrowband and broadband communications. In the network, a narrowband switch queries the services control point in response to a telephone call and the services control point interacts with a subscriber via the subscriber's broadband set-top terminal device through an exchange of one or more signaling messages prior to instructing the narrowband switch as to how to complete the call. For example, the signalling messages may include a query from the services control point for data indicating whether the subscriber's broadband set-top terminal device is in use or is turned off. The signaling messages from the services control point may carry information for display. If provided, response messages may carry user input information.

45 Claims, 6 Drawing Sheets

AIN NARROWBAND TO VIDEO SIGNALLING

FIELD OF THE INVENTION

This invention relates generally to the processing of narrowband and broadband communications in an advanced intelligent network (AIN). In particular, the present invention relates to the use of an services control point for coordinating and integrating narrowband and broadband operations carried out within the AIN.

BACKGROUND OF THE INVENTION

Enhanced telephone networks, frequently referred to as advanced intelligent networks (AIN), provide network operators with considerable flexibility and economy in structuring their product offerings and providing their customers with numerous telephone conveniences and services. The typical AIN architecture allows the switched transport network to interact with database systems and other peripherals for obtaining information, data and support operations. This occurs when the switching network is triggered to access the database or peripheral by some condition that arises when a telephone call is being processed. An AIN trigger will typically arise in an AIN-equipped switch, and that will cause the switch to refer to a database for information or service to support processing of the call. AIN databases are typically accessed via a common channel signaling system—a separate network used for out-of-band signaling.

In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signalling (CCIS) link to a services control point which includes a Multi-Services Application Platform (MSAP) database.

The services control point is essentially a central control for the network. If needed, it can instruct the central office to obtain and forward additional information. Once sufficient information about the call has reached the services control point, the services control point accesses its stored data tables in the MSAP database to translate the received message data into a call control message and returns the call control message to the office of the network via CCIS link. The network offices then use the call control message to complete the particular call.

AIN networks were developed to meet the functional needs associated with the provision of voiceband telecommunications services. See, for example, Berman et al., "Perspectives on the AIN Architecture," IEEE Communications Magazine, February 1992, pp. 27-32. No provision is made for broadband communications, such as video dialtone, in these networks and consequently, the ISCP and each of the other elements in the network is a narrowband element used for narrowband services, such as voice communications. Furthermore, even if broadband communications are available in an AIN network, the enhanced services implemented by the services control point can not be implemented for the broadband communications.

This architectural scheme is the basis for a diversity of network services. AIN techniques are employed by both interexchange and local exchange carriers. For some applications, the attendant common channel signaling systems of multiple carriers have been interconnected so that signaling information can be exchanged for coordinating operations in support of certain telephone services involving both carriers. For example, an interexchange carrier's common channel signaling system and that of a local exchange carrier may be interconnected through a signal transfer point so that signals can be exchanged relative to special service telephone calls involving both carriers, examples of which are such things as "800" calls and calling card calls where number verification is needed.

Concomitant with the advances in AIN technology, significant advances have also been made in the customer premise equipment (CPE)—that apparatus which makes up the terminus equipment between which telecommunications calls are extended through the carrier networks. While CPE may be no more than a simple telephone, it also may be quite complex and include such things as computers interconnected by local area networks (LANs), and other intricate arrangements of terminal equipment and peripheral devices (e.g., facsimile machines, video terminals, databases, and so forth). In particular, the make-up of CPE is becoming more oriented towards broadband communications, such as video services. The composition of CPE used in a typical residential setting, for example, is changing rapidly as computers are increasingly used in the home, and as such things as video, information, and interactive broadband services "on demand" begin to become commercial realities.

Although the combined advances in intelligent networking and customer premise equipment have together resulted in a very effective telecommunications system, the advances on the two sides have been made somewhat independently and not always with a view as to how the operations of each might be coordinated and integrated with the other for even more effective communications. Known networks make little use of the additional broadband capabilities of modern customer premises equipment.

On the network side, the AIN operations are usually carried out entirely within the boundaries of the network. A telephone call, for example, receives AIN treatment only after it enters the network (the "network" takes diverse forms, of course). Typically, the CPE, whatever its make-up, simply directs a call to the network, and only there does it receive whatever AIN treatment it may provoke within the network. Thus, there is a need for better coordination between the CPE and network operations so that, for any particular service, operations in support of the telecommunications exchanged are carried out in a more seamless and integrated fashion.

More specifically, there is a need for techniques that will allow the services control point to look to a subscriber's CPE, particularly broadband equipment, such as a settop box, for information used for controlling and routing both narrowband and broadband communications.

BRIEF SUMMARY OF THE INVENTION

It is an object of the present invention to provide methods and apparatus which will overcome the disadvantages and meet the needs discussed above.

It is also an object of the present invention to coordinate and integrate narrowband and broadband operations carried out in an AIN network.

It is a further object of the invention to provide for coordination and control of narrowband and broadband communications in an AIN network by using a services control point having one or more interfaces to elements of a broadband network.

It is an object of the present invention to provide an AIN architecture which permits a services control point to interact with a customer receiving a telephone call via the customer's broadband customer premises equipment.

It is also an object of the present invention to provide an AIN network architecture which allows a customer's broadband customer premises equipment to transmit information to the services control point of an AIN telephone network, particularly so that the services control point can provide instructions to the narrowband network.

It is a further object of the present invention to provide an AIN network architecture which offers integration of narrowband and broadband services, wherein the narrowband switch queries the services control point in response to a telephone call, and the services control point interacts with a subscriber via the subscriber's broadband set-top terminal device prior to instructing the narrowband switch as to how to complete the call.

The present invention is based upon a realization that numerous advantages would be gained by more closely integrating the services control point of the narrowband AIN telephone network and broadband customer premises equipment, particularly for purposes of controlling routing of telephone services to and from the customer premises. Signalling messages are exchanged between the broadband customer premises equipment and the services control point to coordinate and integrate operations of the two networks, e.g., to exchange service programming information or to exchange line status information.

To achieve these advantages, a preferred embodiment of the invention contains an Integrated Services Control Point (ISCP) and at least one signaling interface between the broadband customer premises equipment and the signaling network of the public switched telephone network. The ISCP can interact with broadband customer premises equipment in a variety of manners to provide a wide range of enhanced services. The ISCP may provide service logic for the customer premises equipment and control communications to and from the customer's on-premises broadband equipment. The interactive functionality of the ISCP may be implemented by hardware, by software or by some combination of the two.

As in AIN implementations in the narrowband network, the ISCP is adapted or programmed to be responsive to AIN-like trigger events as a telephone call is being processed. Data and signaling links are used to commonly access the ISCP and can be used to provision services and/or set various triggers in the network. In a preferred embodiment of the invention, detection of a trigger event by a performing the call processing, causes the ISCP to formulate a request message soliciting information or some support action from the customer's broadband equipment in order for the call processing operations to be continued. The request message can be directed to a broadband element within the CPE or elsewhere within the broadband network. The request message may call for information which will be used for routing or other functions.

The invention makes it possible to integrate narrowband services and video dialtone type services of video dialtone type networks merely by leveraging existing investments for a common set of services without having to rebuild the existing infrastructure for narrowband signaling. The invention enables a number of services that are possible only in an environment where the ISCP is fully integrated with the video and other broadband architectures. Since the ISCP is transport independent, the invention is applicable to any video architecture, including, for example, hybrid fiber coax, switch digital video network, digital MMDS, or ADSL. For example, digital MMDS has a very different transport architecture from a switched digital video network or a hybrid fiber coax network. But the needs of signaling and video selection and video setup are somewhat general across all of the architectures. For example, the video has to be selected, the customer records have to be checked, etc. The ISCP of the present invention is able to provide these capabilities across all networks, and in some embodiments using the exact same signaling architecture that would be in place for those networks. Since the ISCP capabilities are reused and integrated into the signaling networks, there can be fast implementation into existing architectures using switches and live ISCPs.

An interface to the ISCP and/or other databases of the public network may also be provided through software and/or terminal devices maintained on the customer's premises. The software may run on a separate terminal device, such as a set-top box used for video services, or on a suitably programmed personal computer (PC).

With an AIN architecture employed having both broadband and narrowband networks, the signaling systems of the two are tied together through interfaces to the ISCP that permit the exchange of ancillary signaling messages. Extension of the signaling network and AIN signaling and routing control functionality into the broadband network facilitates AIN type routing using information on the status of the broadband CPE and extension of ISCP video services to the customer premises equipment. For example, the ISCP would inquire via the CCIS link as to whether or not a specific called broadband terminal device was busy. The ISCP would not connect the voice portion of the call to the broadband customer premises equipment upon learning that the broadband CPE was busy. Similarly, on outgoing calls, the customer premises equipment could query the public network via the ISCP interface as to aspects, such as cost, of the outgoing call. The customer premises equipment would connect the call to the public narrowband network for actual routing only upon learning that it was allowed under subscriber determined criteria.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

Figure 1:
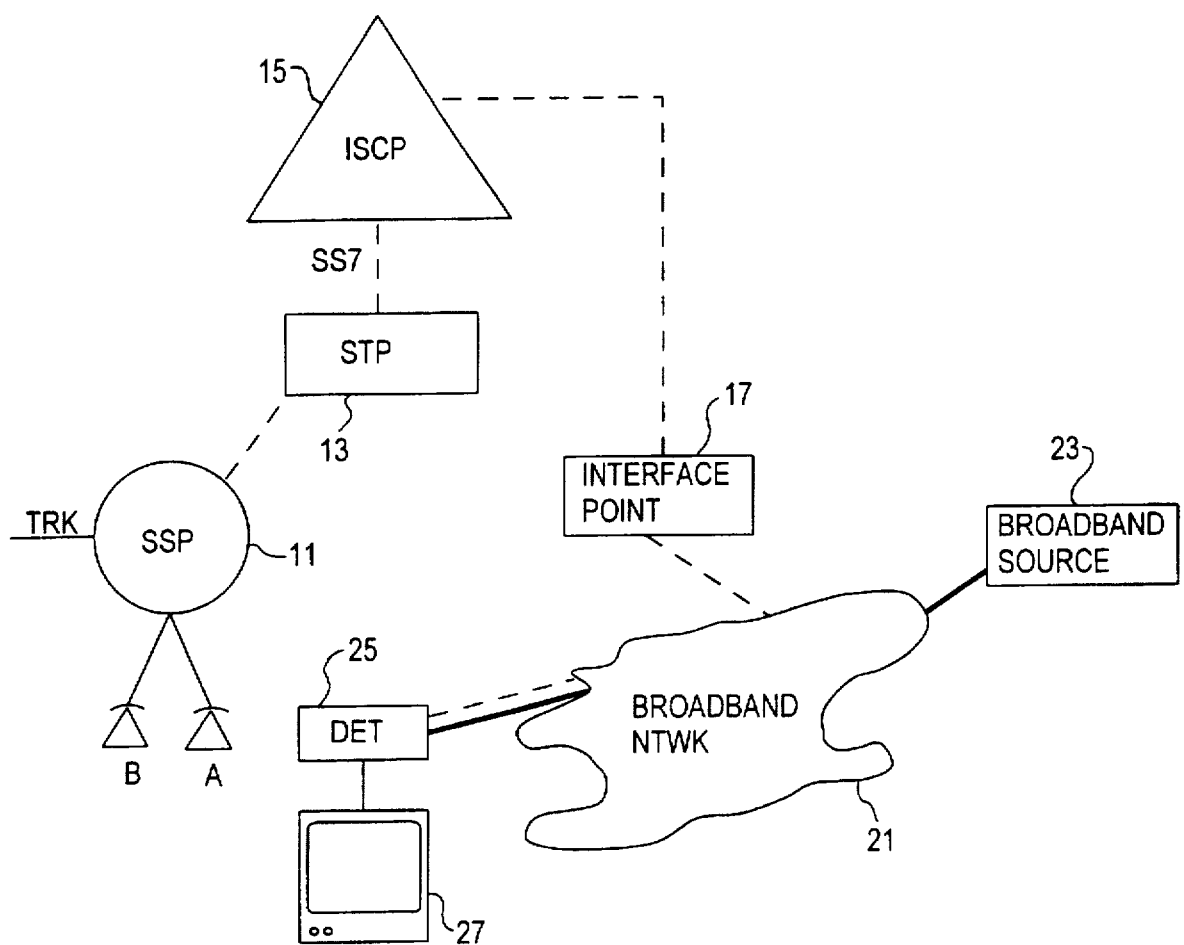
FIG. 1 is a schematic block diagram of an example of an advanced intelligent network architecture providing for ISCP control of narrowband and broadband communications according to the invention.

FIG. 1 is a schematic block diagram of a generic AIN network utilizing ISCP control of narrowband and broadband communications. The customer premises equipment (CPE) of a first customer, customer A, contains a standard telephone and a television or video display 27 which receives video signals through a settop box. In the example shown in FIG. 1, the settop box is a digital entertainment terminal (DET) 25. DET 25 has a data channel and a signaling channel connected to broadband network 21. The details of an exemplary DET can be found in commonly assigned copending U.S. patent application Ser. No. 08/380,755 filed on Jan. 31, 1995 and entitled "Digital Entertainment Terminal with Channel Mapping" or commonly assigned copending U.S. patent application Ser. No. 08/498,265 filed on Jul. 3, 1995 and entitled "Downloading Operating System Software through a Broadcast Channel", both of which are hereby incorporated by reference in their entirety.

Although a single broadband source 23 is shown in FIG. 1, the broadband network may have any number of connected sources and end users. Although shown as delivering video information through DET 25, the broadband network may deliver any type of, or any number of types of, broadband information. For example, the broadband network 21 could also transmit digital multimedia information, and the customer premises equipment could include a personal computer and computer monitor instead of, or in addition to, DET 25 and television 27. A Power PC is preferred so that the personal computer may easily match up with the standard settop boxes. It should also be understood that the broadband network may be of any architecture, using any currently existing or later developed technology.

The broadband network 21 is connected to an services control point through an interface point 17. In the preferred embodiment of the invention, the services control point is BellCore's Integrated Service Control Point (ISCP) Software system as generally discussed in a 1992 document entitled "An Introduction to Bellcore's Integrated Service Control Point Software" or a revised version thereof, such as Release 2.2. The signaling interface protocol and connection with ISCP 15 may be of any currently existing or later developed signaling interface used in Bellcore's TELEGATE software products or elsewhere. See, for example, "The SPACE system: A new dimension in service creation", Bellcore Exchange, January/February 1992, pp. 8–13, and "Turning concepts into reality with the SPACE system", Bellcore Exchange, May/June 1992, pp. 25–28. Specific ISCP to broadband network signaling interfaces are also discussed below with respect to FIGS. 4–8. The ISCP 15 also has an SS7 signaling connection to a signal transferring point (STP) 13. A signal switching point (SSP) 11 provides narrowband switching for a large number of connected telephone customers, including customer A connected to broadband network 21, and may accept narrowband information over a trunk line(s) connected to, for example, other SSPs.

Although shown as separate elements in FIG. 1, it should be understood that there may be some physical or virtual connection or relationship between the narrowband network including SSP 11 and STP 13 and broadband network 21. For example, broadband network 21 could receive broadband source information from SSP 11 through a T1 line or other broadband connection, or the DET 25 of customer A could be connected to and receive video information over the same telephone line from SSP 11 providing standard telephone service.

Figure 3:
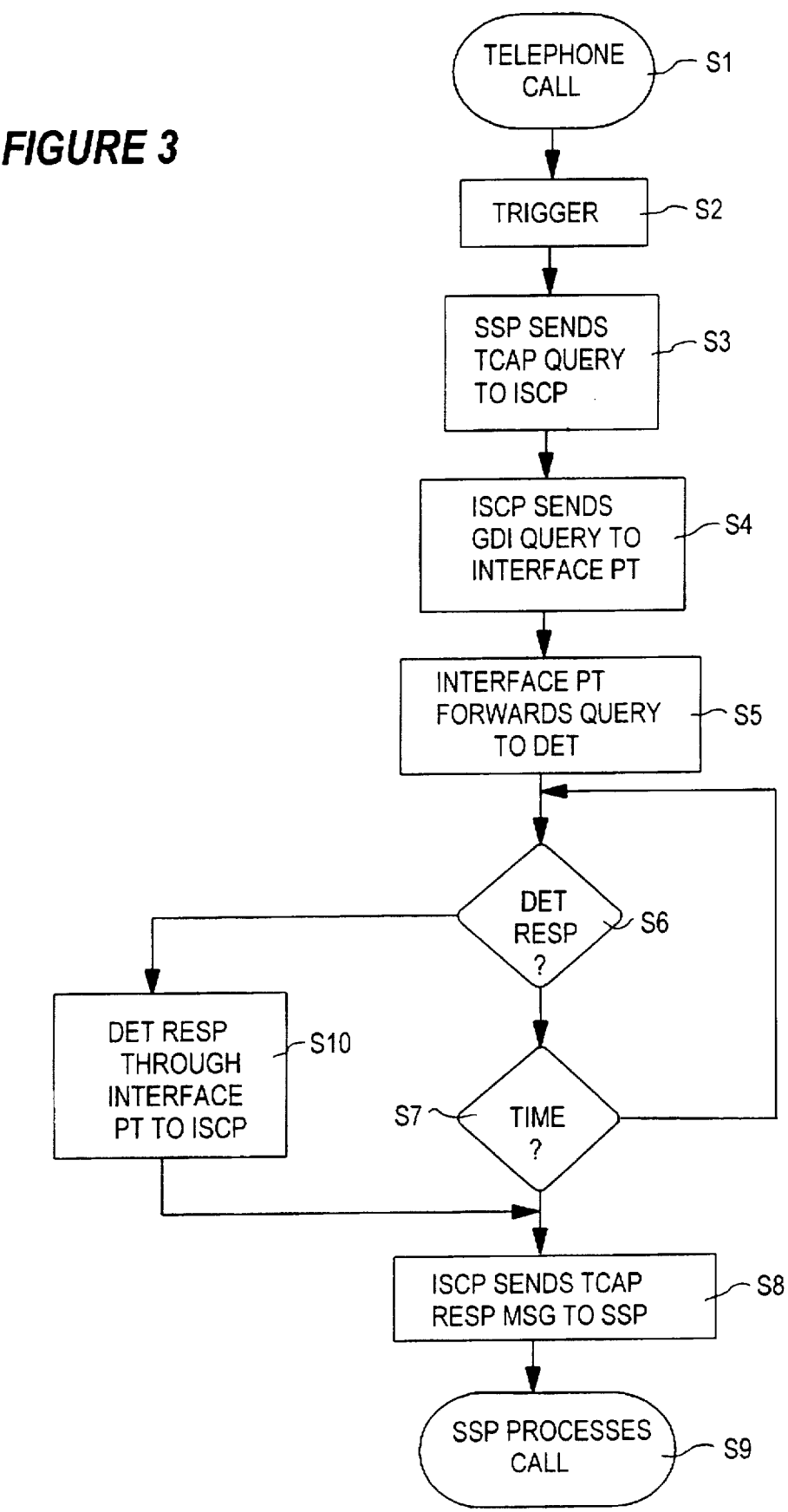
FIG. 3 is a flowchart useful in explaining the method of controlling video using a services control point in a preferred embodiment of the invention.

The architecture shown in FIG. 1 can provide video services in any number of ways of which the method shown in FIG. 3 is but one example. A trigger is set in the customer profile information stored in SSP 11 with respect to the narrowband line of customer A. The trigger may relate to any one of a variety of call processing conditions. As a simple example, assume that SSP 11 contains a terminating attempt trigger which is activated whenever somebody is making a telephone call (Step S1) to customer A. When SSP 11 detects a trigger (S2) in response to a telephone call, the SSP 11 composes and sends a TCAP query up to ISCP 15 (Step S3) before the telephone call hits and rings on the phone line of customer A.

The terminating trigger detected in Step S2 is independent from the video service. It may be set on all lines or stations, or only on the ones of customers that have the video service, or only on the ones of customers having a video service controlled by the ISCP. To avoid unnecessary network traffic, the trigger is preferably set only on the lines of customers having a video service controlled by the ISCP. The trigger may be set and left on or it may be set by the switch when the customer sets up his video service, for example, to watch a movie.

The preferred approach is to leave the trigger on all the time; and either the ISCP 15 is informed as to whether somebody is watching a movie through the DET 24 or the ISCP 15 asks the Level 1 gateway or other element whether the DET is active. The ISCP 15 preferably uses the TELEGATE getData/sendData Interface (GDI), described in Issue 1 of the Bellcore specifications released on May 25, 1993, which is a generic interface for getting and sending data between TELEGATE (and/or other) systems. The data interface is used to send a packet down to interface point 17 that says "send data" to find out the current status (Step S4). Then interface point 17 forwards the query to DET 25 through the broadband network 21 (Step S5). The ISCP 15 then waits to receive a response from the DET 25 through the interface point (Step S10). The DET or other broadband terminating device of the CPE then quickly returns an automated response. The query and response may be very simple, such as whether or not a video event is in progress. Alternatively, the DET may format the query into a textual or other type of message (e.g., Caller ID) and display it at the bottom of the screen on TV 27, before the phone has ever even rung. In this later case, the customer then enters a response into the DET 25 which is forwarded to the ISCP 15 through broadband network 21 and the interface point 17. The response may indicate the customer's preferred disposition of that call.

The status query may be unanswered if the CPE is not on (Step S6) or a certain pre-designated or programmed time period elapses before a response is received (Step S7). The GDI interface process can time out at, e.g., 2, 5, 10, or 15 seconds, so that the narrowband call processing might have a default where the call will go to voice mail or it will just ring on the regular telephone. The ISCP can be custom programmed with default service logic for each customer. The ISCP, for example, could route the telephone call in the normal manner or initiate a voice mail type of service. As a further alternative, the ISCP could store information regarding each detected call without a positive response from the DET and give an indication to the customer premises equipment either by an interrupted dialtone or a signaling message displayed across the TV screen the next time the user turns on the DET 25 indicating that the customer has received at least one phone call. The information related to the series of phone calls could be stored in the DET or stored elsewhere with a message sent to the DET indicating that when it is turned on it should retrieve the list. DET 25 may be of a type that is not up and running all the time so long as the signal reception equipment is always running while the DET in the power-down state.

The important advantage is that these steps occur before the customer's phone rings or the network otherwise terminates the call processing (Step S9). Therefore, the query or message appears on the customer's TV set 27, and with a remote control, the customer can press a key and send a selectable response back to the ISCP 15. The selectable responses may include the options of, for example, routing the call to voice mail or forwarding it to another predesignated telephone number, even a cellular telephone number. The selectable responses may also include a full destination telephone number, entered in real time by the customer and simultaneously displayed on the screen, to which the call is forwarded. By making a query with the send data GDI query and getting a response, the ISCP 15 can send an appropriate TCAP response message to SSP 11 instructing the switch to forward to any telephone number that can be programmed anywhere in the country (Step S8). This allows call forwarding based on real-time user input such as a user remote control. The service logic in the ISCP determines what instruction corresponds to the user response.

The terminating attempt trigger used in the method shown in FIG. 3 allows the switch to continue to be part of the processing of the call during the interaction of the user. The length of delay in completing the above steps depends on how the interfacing is set. Of course, the ISCP will time out interacting with the DET at the predefined interval in step S7 if a response is not received back from the user. There is also a time out value between the ISCP and the narrowband switch, at which time the switch may be instructed to play an advertisement, a recording that sounds like ringing or a message to the caller indicating that they should hold. The times on each interface are flexible and can be changed and modified based on user requirements or service requirements.

Methods other than the one shown in FIG. 3 may be used in a network with identical capability and architecture. For example, there may also be an originating trigger in the standard telephone of the CPE so that a query is sent and a text message forwarded down for display on the TV set. The TV user enters a response to indicate their desired processing of the call, and the ISCP sends a message to the switch accordingly. Any configuration of the basic architecture shown in FIG. 1 is possible and the broadband network architecture is interchangeable as long as the elements of the broadband network can accept a GDI message or other standard interface message and respond with information based on what the customer inputs through the remote control of the DET.

The ISCP can integrate various networks, such as the cellular network and the wireline network for our PCS service. The ISCP has an interface to IS 41 cellular-type signaling as well as the AIN 0.1 message sets for narrowband signaling. The capability of integrating those two different message sets creates cross network services. Some services could be performed by using an integrated broadband cellular wireline switch, but putting the service logic in the ISCP makes it easy.

Since the ISCP is transport independent, the invention is applicable to any video architecture, including, for example, hybrid fiber coax, switched digital video network, MMDS, or ADSL. MMDS has a very different transport architecture than a switched digital video network or a hybrid fiber coax network. However, the needs of signaling and video selection and video setup are somewhat general across all of the architectures. For example, the video has to be selected, the customer records have to be checked, etc. The ISCP of the present invention is able to provide these capabilities across all networks, and in some embodiments using the exact same signaling architecture that would be in place for those networks. Since the ISCP capabilities are reused and integrated into the signaling networks, there is fast implementation into existing architectures using switches and live ISCPs.

Figure 2:
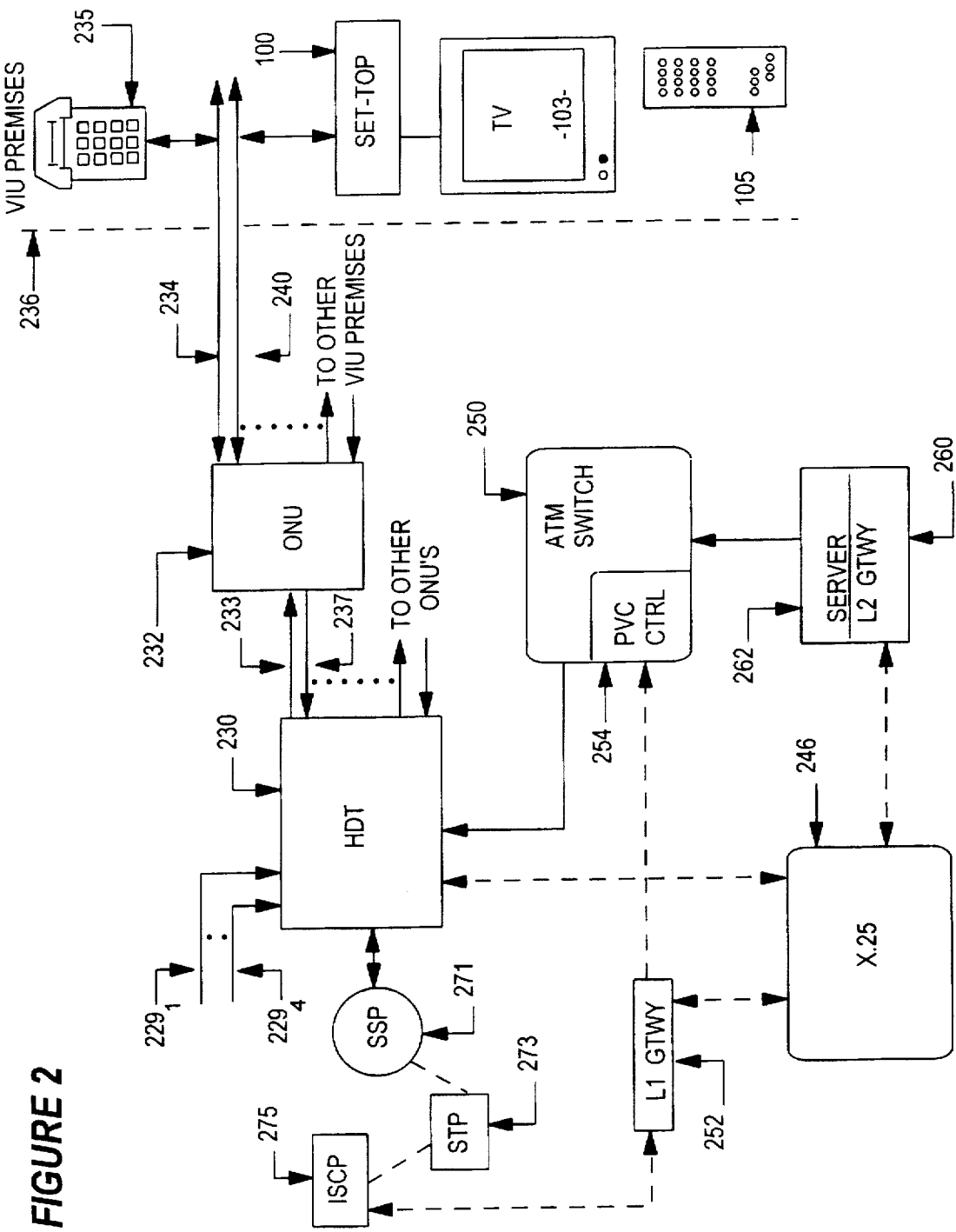
FIG. 2 is an illustration of an exemplary implementation of the invention in a full service network providing broadband video service and having a set-top terminal for interacting with the ISCP of the AIN network.

FIG. 2 illustrates a preferred architecture for a full service network providing transport for broadband services, including broadcast video and IMTV type services such as video on demand, and implementing ISCP capabilities for the broadband services such as the method described above.

An ATM backbone network includes four optical fibers $229_1$ to $229_4$ carrying broadcast programming from an ATM edge device (not shown) to a large number of host digital terminals (HDT's) 230 (only one of which is shown in FIG. 2). The ATM edge device may comprise a relatively small capacity ATM switch. A more detailed description of the ATM edge device and its operation is disclosed in commonly assigned U.S. patent application Ser. No. 08/380,744 filed Jan. 31, 1995 entitled "Full Service Network Using Asynchronous Transfer Mode Multiplexing" (attorney docket no. 680-109), the disclosure of which is incorporated herein in its entirety by reference. Each optical fiber 229 carries 16 bit interleaved DS3 rate bit streams. Each DS3 rate stream contains 6 time division multiplexed ATM virtual circuits. Each virtual circuit carries 6 Mbits/s of digitized and compressed programming, e.g. encoded in MPEG II form and adapted for ATM cell transport.

The ATM backbone network includes at least one ATM switch 250 controlled by a PVC controller 254. A subscriber wishing to initiate an interactive broadband communication session interacts with a level 1 gateway 252 which in turn communicates with the PVC controller 254 to obtain the requisite bandwidth through the switch 250.

Each video information user (VIU) premises 236 is pre-assigned three DS3 slots on the downstream fiber from the HDT 230 to the ONU 232 for broadband service. Each home or living unit 236 is preferably allocated a capacity of four set-top terminal devices 100, with three being active at any one time. A coaxial drop 240 for each premises 236 carries 180 Mbits/s baseband digital data, which will simultaneously transport three 45 Mbits/s DS3 bit streams. For a particular VIU premises 236, the three DS3 channels on the fiber from the HDT 230 to the ONU 232 and on the drop cable 240 are individually assignable to different set-tops 100 within the subscriber's premises 236. The HDT 230 performs a switching type functionality to route a DS3 carrying a selected program from the fibers 229 or the fiber from the ATM switch 250 to each DS3 on the downstream fiber 233 assigned to a set-top 100. The ONU 232 performs optical to electrical conversion, separates out the DS3's received over the downstream optical fiber 233 from the HDT 230 and supplies the selected DS3 bit streams to appropriate channels on the coaxial cables 240 going to the respective subscriber premises 236.

The local loop network consists of the HDT 230, two-way optical fiber pairs between the HDT 230 and optical network units 232 (ONU's), and coaxial cables 240 and twisted wire pairs 234 connecting the ONU's to the subscriber premises equipment. In addition to broadband, the network illustrated in FIG. 2 will also provide narrowband transport for voice and narrowband data services. A digital switch or an analog implementation of an SSP switch 271 provides standard type plain old telephone service (POTS) for customers of the Full Service Network. The digital POTS switch provides a DS1 type digital input/output port through interfaces conforming to either TR008 or TR303. The DS1 goes to the HDT 230. The DS1 may go through a digital cross-connect switch (DCS) for routing to the various HDT's or directly to a multiplexer (not shown) serving a particular HDT 230. The multiplexer may also receive telephone signals in DS1 format from an analog switch through a central office terminal. The central office terminal converts analog signals to digital and digital signals to analog as necessary to allow communication between the analog switch and the rest of the network.

Although not shown, the telephone service multiplexer for an HDT 230 may multiplex a number of DS1 signals for transmission over one fiber of an optical fiber pair to the HDT 230 and to demultiplex signals received over the other fiber of the fiber pair. The fiber pairs between the HDT 230 and the ONU's 232 will also have a number of DS1 channels to carry telephone and narrowband data signals to and from the subscriber's premises. In addition to the video services discussed above, the ONU 232 will provide telephone signals and appropriate power to the subscribers' premises over the twisted wire pairs 234 connected to subscribers' telephone sets 235.

Signaling communications between the set top 100 and the serving HDT 230 utilize a consumer electronics (CE) bus protocol. In the presently preferred embodiment, signaling communications between the other nodes of the network ride on an X.25 packet switched data network 246. In future implementations, instead of data network 246, the ATM switch 250 will carry the signaling traffic together with the IMTV broadband traffic.

In the illustrated embodiment, the downstream optical fiber from the HDT 230 to each ONU 232 may use either an asynchronous optical protocol, or the synchronous (SONET) OC rate transport. The ONU's 232 provide appropriate interfacing between the voice channels on the fibers and twisted wire pair 234 for telephone service into the subscriber premises.

For narrowband signaling information, the ONU 232 passes all of the downstream signaling data received from the HDT 230 on fiber 233 through to all of the coaxial drop cables 240, so that for signaling data the cables look like a common bus shared by all of the connected set-tops. In the downstream direction, signaling packets are interleaved with the ATM cell stream packets. In the upstream direction, the signaling channel on the coaxial cable 240 is in a different frequency portion of the spectrum from the downstream DS3 transmissions. The ONU combines all of the upstream signaling packets from subscriber drop cables 240 into a digital data stream and transmits that data stream together with digitized upstream telephone service signals over the upstream fiber 237 to the HDT 230.

Each set-top 100 comprises a DET and NIM. In this embodiment, the NIM connects to the coaxial drop cable 240 to send control signals to the ONU 232 and receive video and data signals from the ONU 232. The NIM includes means to selectively demodulate received data from an assigned one of the three DS3 slots on the coax cable 240 and an ATM demux for mapping ATM cells from one ATM virtual circuit in that DS3 back into the corresponding MPEG packets. Specifically, the ATM demux captures and processes ATM cells bearing specified VPI/VCI header information corresponding to the selected program channel from the DS3 stream.

Each set-top 100 includes means to receive selection signals from a user via remote control, and as noted above, the set-top responds by transmitting appropriate data signals over a narrowband signaling channel on the coaxial drop cable to the ONU 240. According to the preferred embodiment, the narrowband signaling channel uses X.25 or a consumer electronics (CE) bus protocol. With the CE bus protocol, for example, the active set-tops 100 are assigned signaling time slots by the HDT 230, and each active set-top 100 transmits channel selection data upstream to the ONU 232 in its assigned slot.

The ONU 232 multiplexes the data signals from the set-tops it services together and transmits those signals to the HDT 230 over an upstream channel on an optical fiber. If the data represents selection signals, the HDT responds to that data as outlined above, and stores data identifying each subscriber's selections for subsequent periodic uploading through a first X.25 packet data communication network 246.

In operation, each time a subscriber turns on a set-top 100, the set-top transmits an appropriate signaling message upstream to the HDT 230. The HDT stores a table of valid equipment ID's for the set-tops it services. The signaling message transmitted to the HDT 230 at turn-on includes the equipment ID for the particular set-top 100. When the HDT 230 receives the initial signaling message from the set-top, the HDT executes a routine to initialize the set-top. As part of this initialization routine, the HDT 230 validates the set-top equipment ID and assigns one of the DS3 slots on the downstream fiber 233 to the ONU 232 to that set-top for as long as that set-top remains on. Also, one of the DS3's on the subscriber's coaxial drop cable 240 from the ONU 232 is assigned to the set-top 100 for the duration of communications.

At the same time, the HDT 230 will complete a two-way signaling communication link with the DET in the particular set-top 100. At least on the coaxial cable portion, the packets relating to the signaling link are identified by header information identifying the particular link, i.e. a signaling identifier assigned to this communication between the HDT 230 and the particular set-top 100. As part of the initialization routine, the HDT 230 sends one or more signaling messages to the DET in set-top 100 identifying the signaling channel assignment and the DS3 assignment. Specifically, for the signaling link, the HDT 230 assigns the next idle signaling ID to this call and informs the DET of that signaling ID assignment. The HDT 230 addresses downstream control messages to the set-top using the assigned signaling call ID. When queried, the subscriber's set-top 100 provides an appropriate "off-hook" signal to the HDT 230. The HDT 230 sends the message through the X.25 packet switched network 246 to the Level 1 Gateway (L1 GTWY) 252. Once the initial message is accepted, an X.25 signalling link is provided between the HDT 230 and the Level 1 Gateway 252 for purposes of carrying signaling information between the set-top 100 and the Gateway, and the HDT 230 internally associates that signaling call with the signaling call over the fibers 233, 237 and the coaxial cable 240, i.e. the signaling link set up from the HDT 230 through the ONU 232 to the set-top 100 when the user turned on the set-top terminal.

The set-top 100 may also send an initiation or 'hello' message to the Level 1 Gateway 252 that includes basic information including the set-top ID and a set-top type designation. The Level 1 Gateway 252 interacts with the subscriber through the set-top 100 to obtain a selection in response to a query. The Level 1 Gateway 252 receives a selection input from the set-top 100, e.g. in response to a menu display, within a predetermined period following the menu transmission. If the Level 1 Gateway 252 receives the selection input message from the set-top 100 within the predetermined period, the Level 1 Gateway 252 translates that message accordingly. The Level 1 Gateway 252 may act on the response, e.g. to set up an interactive session through the ATM switch 250 to a VIP's server 260 and through data network 246 to the VIP's level 2 gateway 260. Under certain circumstances, the gateway 252 forwards the message to ISCP 275 for processing in accord with the present invention.

During broadband communications, the set-top 100 can transmit control signalling upstream through the ONU 232, the HDT 230, the X.25 data network and the Level 1 Gateway 252 to the ISCP 275. The ISCP 275 can also send signaling information, such as queries and control data, downstream through the same path to the DET 238. The network preferably utilizes standardized interfaces for signalling messages between L1GW 252 and ISCP 275 in order to remove both complex processing and difficult to maintain data from the system requirements of a network element.

The Integrated Services Control Point (ISCP) currently manages six standardized network interfaces: AIN 0.0, AIN 0.1, IS 41 Rev A, IS 41 Rev B, 1129+, and GDI. Three other network interfaces may be implemented soon: AIN 0.2, Core INAP, and IS 41 Rev C. These or other interfaces are used to allow various existing and future video network elements to connect to the ISCP in order to off-load a portion of their system's processing and data requirements and provide additional ISCP managed service functionality for both the end customer and Video Information Provider (VIP).

Figure 4:
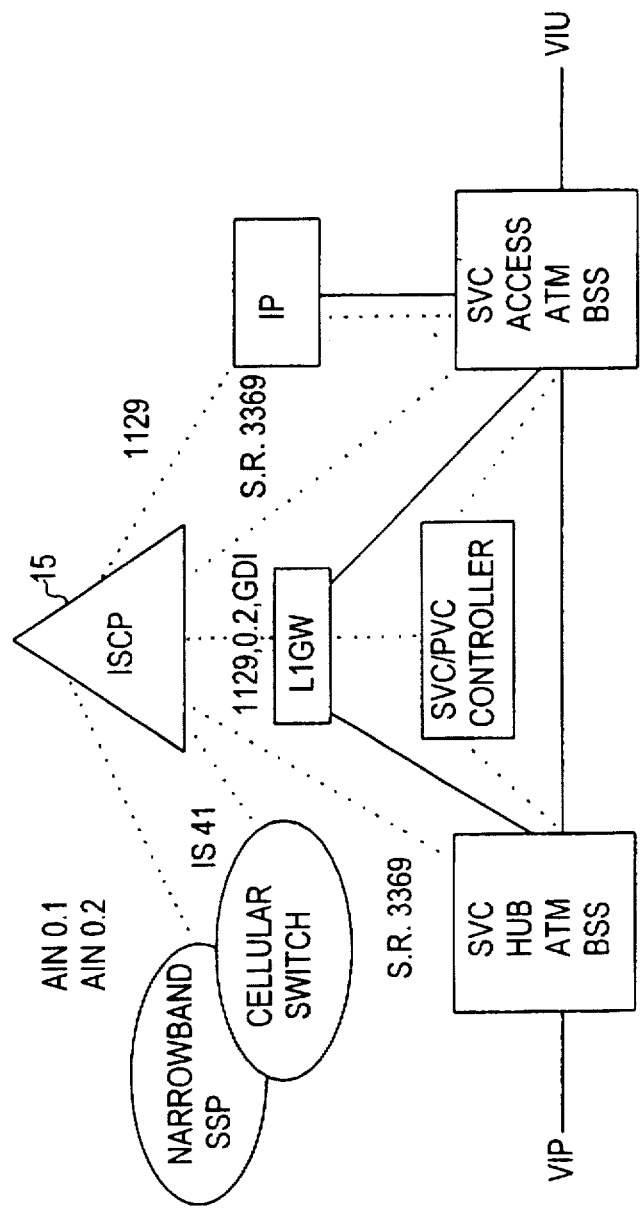
FIG. 4 is a block diagram showing various ISCP to broadband video network signaling interfaces.

FIG. 4 identifies various ISCP to video network signaling interfaces that might be available to different video components in order to provide different services. Most common are the AIN 0.1 and AIN 0.2 interfaces used to provide signalling between ISCP 15 and signal switching points of the narrowband public switched telephone network. The ISCP also supports an IS 41 interface to cellular switches, an 1129 interface to an intelligent peripheral and a S.R. 3369 interface to an ATM broadband switching system. The ISCP may interface with a SVC/PVC controller through a level 1 gateway using any one of the 1129, AIN 0.2 or GDI interfaces.

There are at least four different interface embodiments for video network element query access and interaction with the ISCP.

Figure 5:
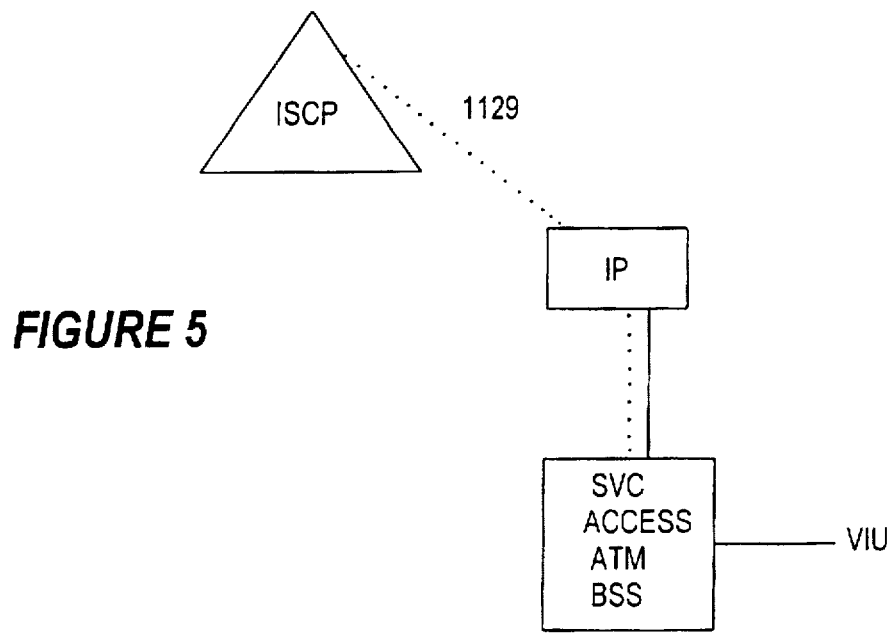
FIG. 5 is a block diagram showing a first ISCP to broadband video network signaling interface.

FIG. 5 illustrates the 1129+ Intelligent Peripheral (IP) Interface. In this embodiment, the broadband customer premises equipment connects directly to an Intelligent Peripheral (either prior to L1GW connection, or as a L2GW). Consequently, a VDT customer can use a remote control to directly interact with (and update) information residing on the ISCP or within an associated Operations Support System (OSS).

Figure 6:
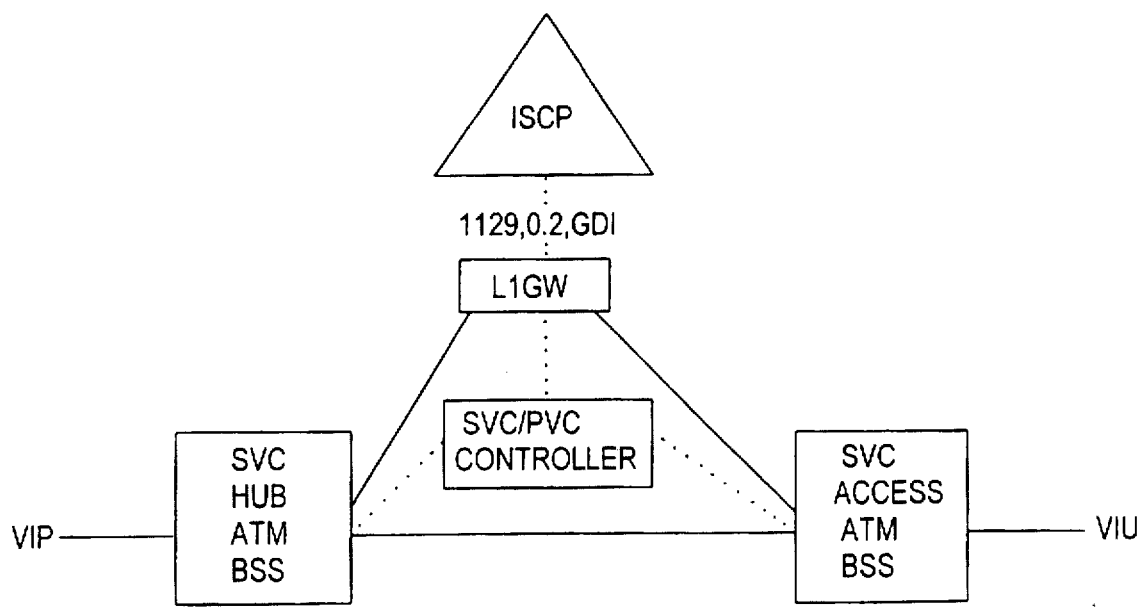
FIG. 6 is a block diagram showing a second ISCP to broadband video network signaling interface.

FIG. 6 shows a level 1 gateway (L1GW) which incorporates the capability to initiate an ISCP Query. The L1GW interacts with the customer and a variety of service information must be managed in order to successfully process the customer's transaction. Instead of creating the necessary process and data management functions on the L1GW, this embodiment has the L1GW query the ISCP. The ISCP then uses its existing capabilities to complete the transaction.

Figure 7:
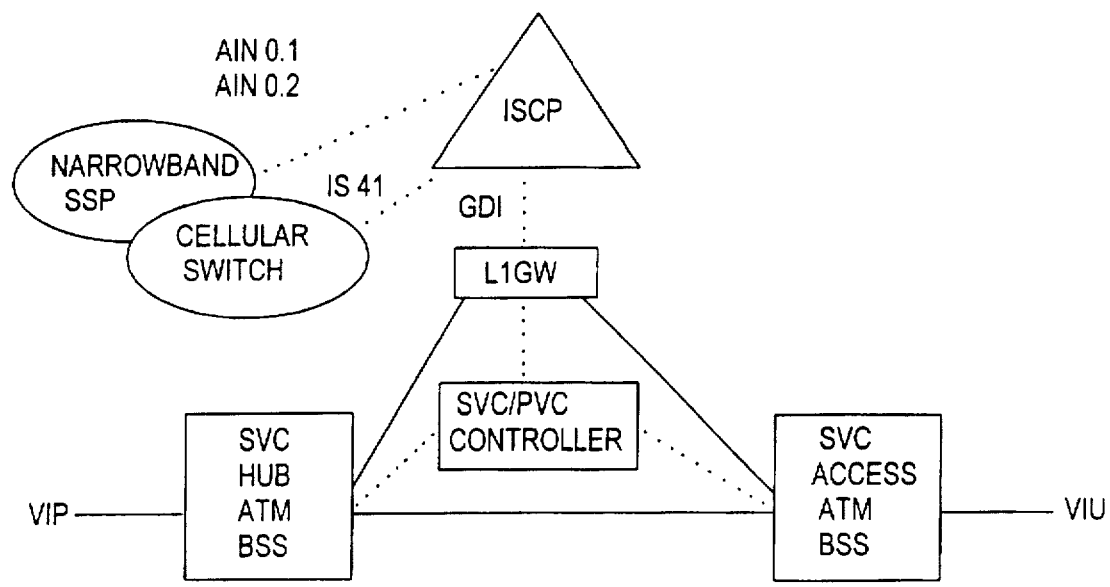
FIG. 7 is a block diagram showing a third ISCP to broadband video network signaling interface.

FIG. 7 shows the L1GW accepting ISCP initiated queries based on narrowband or cellular Activity. In this embodiment, video dial-tone services can be developed which are invoked based on traffic originating on the narrowband or cellular networks. Since narrowband and cellular switches are able to issue queries to the ISCP, subsequent queries must then originate from the ISCP and arrive at the L1GW. When a query reaches the L1GW, service delivery software code is then invoked to provide a value added service to the customer.

Figure 8:
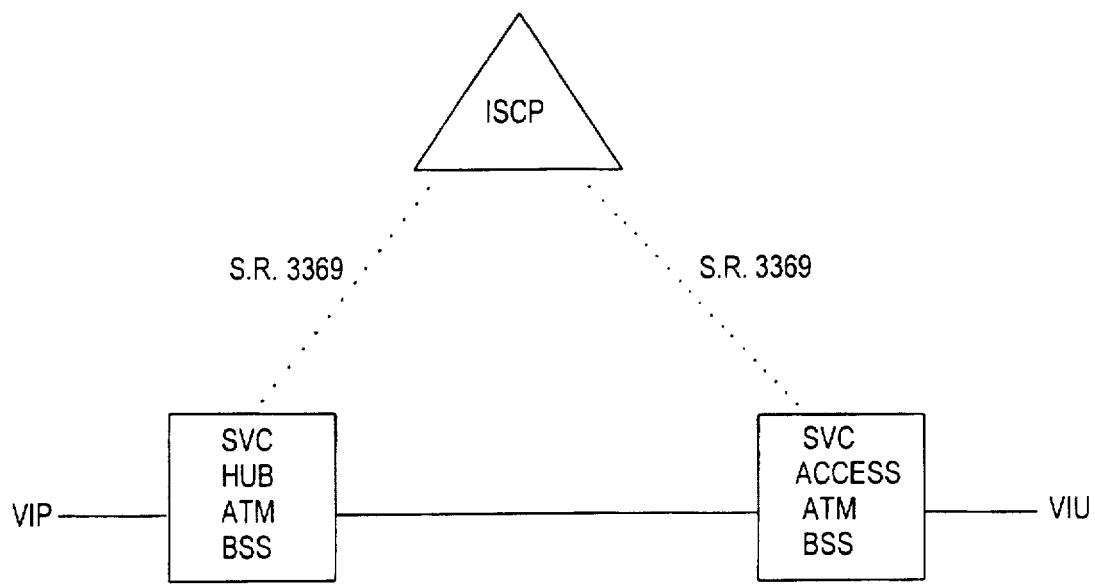
FIG. 8 is a block diagram showing a fourth ISCP to broadband video network signaling interface.

FIG. 8 shows an ATM Switch—Broadband Switching System (BSS) Interface which uses a standard AIN interface between the ATM switching fabric and the ISCP. The BBS interface may be the existing Bellcore defined interface known as S.R. 3369 (which closely matches the AIN 0.2 Interface specification) or any other present or future interface. The ISCP in such an environment could potentially provide direct person-to-person "video call" type services.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. An advanced intelligent network providing narrowband and broadband signalling interconnections and service integration, said network comprising:

a narrowband network for voiceband communications having at least one signal switching point (SSP) and a plurality of telephone subscriber stations connected to the at least one SSP;

a broadband network, at least one telephone subscriber having a broadband customer premises equipment connected to said broadband network;

at least one broadband source providing broadband information to said broadband network, said broadband customer premises equipment receiving at least a portion of said broadband information provided by said at least one broadband source; and a services control point, connected to said narrowband network and said broadband network and operative to perform network service logic programs for said narrowband and broadband networks; and an interface point, connected between said services control point and said broadband network, for providing signalling communications between said services control point and said broadband customer premises equipment for coordinating and integrating narrowband and broadband operations.

2. The network of claim 1, wherein the broadband information comprises video information, and the broadband customer premises equipment includes a settop box responsive to said video information and to signalling messages from said services control point.

3. The network of claim 2, wherein said services control point is an Integrated Services Control Point (ISCP) comprising a plurality of interfaces to the narrowband and broadband networks.

4. The network of claim 3, wherein at least one of said interfaces permits the ISCP to interact with the settop box of a customer receiving a telephone call via said narrowband network.

5. The network of claim 3, wherein said ISCP sends a query to the broadband customer premises equipment through one of said interfaces in response to the receipt of a telephone call through the narrowband network.

6. The network of claim 5, wherein the signal switching point of said narrowband network contains a terminating trigger event which sends a query to the ISCP in response to the receipt of said telephone call.

7. The network of claim 6, wherein the terminating trigger event is a terminating attempt trigger.

8. The network of claim 5, wherein the broadband customer premises equipment sends a response to the ISCP in response to the query before the telephone call is terminated.

9. The network of claim 8, wherein said ISCP sends the query to the customer broadband premises equipment through the interface point which comprises a level 1 gateway of the broadband network.

10. The network of claim 9, wherein said ISCP is connected to said level 1 gateway through a get data interface.

11. The network of claim 9, wherein said ISCP is connected to said level 1 gateway through an AIN interface.

12. The network of claim 9, wherein said ISCP is connected to said level 1 gateway through a 1129+ interface.

13. The network of claim 8, wherein said ISCP sends the query to the broadband customer premises equipment through an intelligent peripheral using a 1129+interface.

14. The network of claim 8, wherein said ISCP sends a query to the broadband customer premises equipment through an ATM broadband switching system using a S.R. 3369 interface.

15. The network of claim 2, wherein said settop box comprises a digital entertainment terminal of a customer receiving a telephone call via said narrowband network which interacts with said services control point.

16. The network of claim 15, wherein said services control point sends a query to the digital entertainment terminal through one of a plurality of interfaces to the narrowband and broadband networks in response to the receipt of a telephone call through the narrowband network.

17. The network of claim 16, wherein the digital entertainment terminal sends a response to the services control point in response to the query before the telephone call is terminated.

18. The network of claim 17, wherein the services control point sends the query to the digital entertainment terminal through the interface point which comprises a level 1 gateway of the broadband network.

19. A method of providing integrated narrowband and broadband communications for a customer in an advanced intelligent network, said customer have narrowband and broadband customer premises equipment, the method comprising the steps of:

sending a query to an integrated services control point, integrated with a narrowband network and a broadband network and operative to perform network service logic programs for said narrowband and broadband communications, in response to a triggering event;

providing signalling communications between said integrated services control point and broadband customer premises equipment;

responding to the query from the services control point by sending information to the integrated service control point, said information indicating the operating status of said broadband customer premises equipment or the status of broadband communications with said broadband customer premises equipment.

20. The method of claim 19, wherein said broadband communications comprises video services and the step of providing signaling communications between said integrated services control point, and said broadband customer premises equipment comprises sending a query to a settop box.

21. The method of claim 20, wherein said step of sending a query to the services control point is performed in response to the receipt of a telephone call.

22. The method of claim 21, wherein receipt of the telephone call is detected by a terminating trigger event in a signal switching point of the narrowband network.

23. The network of claim 22, wherein the terminating trigger event is a terminating attempt trigger.

24. The method of claim 21, wherein said services control point sends a query to the settop box and the settop box sends information responsive to the query through an interface point connected to the broadband network in response to the receipt of the telephone call.

25. The method of claim 21, wherein the step of sending a query to the services control point is performed before the telephone call is terminated.

26. The method of claim 21, wherein the services control point sends an instruction to the narrowband network in response to the information received from the settop box, said instruction being determined by the information received from the and the service logic in the services control point.

27. The method of claim 21, wherein said information indicates a user response entered through the broadband customer premises equipment.

28. The method of claim 20, wherein the steps of sending a query to a settop box and sending information to the services control point are conducted through a level 1 gateway.

29. The method of claim 28, wherein said services control point is connected to said level 1 gateway through a data interface.

30. The method of claim 28, wherein said services control point is connected to said level 1 gateway through an AIN interface.

31. The method of claim 28, wherein said services control point is connected to said level 1 gateway through a 1129+ interface.

32. The method of claim 20, wherein said services control point sends a query to the customer broadband premises equipment through an intelligent peripheral using a 1129+ interface.

33. The method of claim 20, wherein said services control point sends a query to the customer broadband premises equipment through an ATM broadband switching system using a S.R. 3369 interface.

34. The method of claim 19, wherein said broadband communications comprises video services and the step of providing signaling communications between said integrated services control point, and said broadband customer premises equipment comprises sending a query to a digital entertainment terminal.

35. The method of claim 34, wherein said step of sending a query to the services control point is performed in response to the receipt of a telephone call.

36. The method of claim 35, wherein receipt of the telephone call is detected by a terminating trigger event in a signal switching point of the narrowband network.

37. The network of claim 36, wherein the terminating trigger event is a terminating attempt trigger.

38. The method of claim 35, wherein said services control point sends a query to the digital entertainment terminal and the digital entertainment terminal sends information responsive to the query through an interface point connected to the broadband network in response to the receipt of the telephone call.

39. The method of claim 35, wherein the step of sending a query to the services control point is performed before the telephone call is terminated.

40. The method of claim 34, wherein the steps of sending a query to a digital entertainment terminal and sending information to the services control point are conducted through a level 1 gateway.

41. In an integrated narrowband and broadband communications network, wherein a customer has narrowband and broadband customer premises equipment, the method comprising the steps of:

detecting a narrowband call for the customer narrowband equipment at a narrowband switching office;

in response to the narrowband call, sending a query to a services control point, storing network service logic programs for controlling at least some call processing through the communications network;

transmitting a signalling message containing at least some information regarding the narrowband call from the services control point to the broadband customer premises equipment;

transmitting a call control signaling message based on a selected one of the network service logic programs from the service control point to the narrowband switching office; and processing of the narrowband call through the narrowband switching office in response to the call control signaling message.

42. The method of claim 41, wherein the step of detecting a narrowband call comprises detecting a narrowband call directed to the customer premises equipment.

43. The method of claim 41, wherein the step of detecting a narrowband call comprises detecting a narrowband call from the customer premises equipment.

44. The method of claim 41, wherein:

the method further comprises the step of receiving a response message containing predetermined information from the broadband customer premises equipment; and the selected one of the network service logic programs specifies a call processing instruction for inclusion in the call control signaling message in response to the predetermined information.

45. The method of claim 41, wherein the narrowband and broadband customer premises equipment are located within one customer premise.

* * * * *